No. 683,149. Patented Sept. 24, 1901.
E. B. SISKRON.
FLOUR SIFTER.
(Application filed Sept. 6, 1900.)
(No Model.)
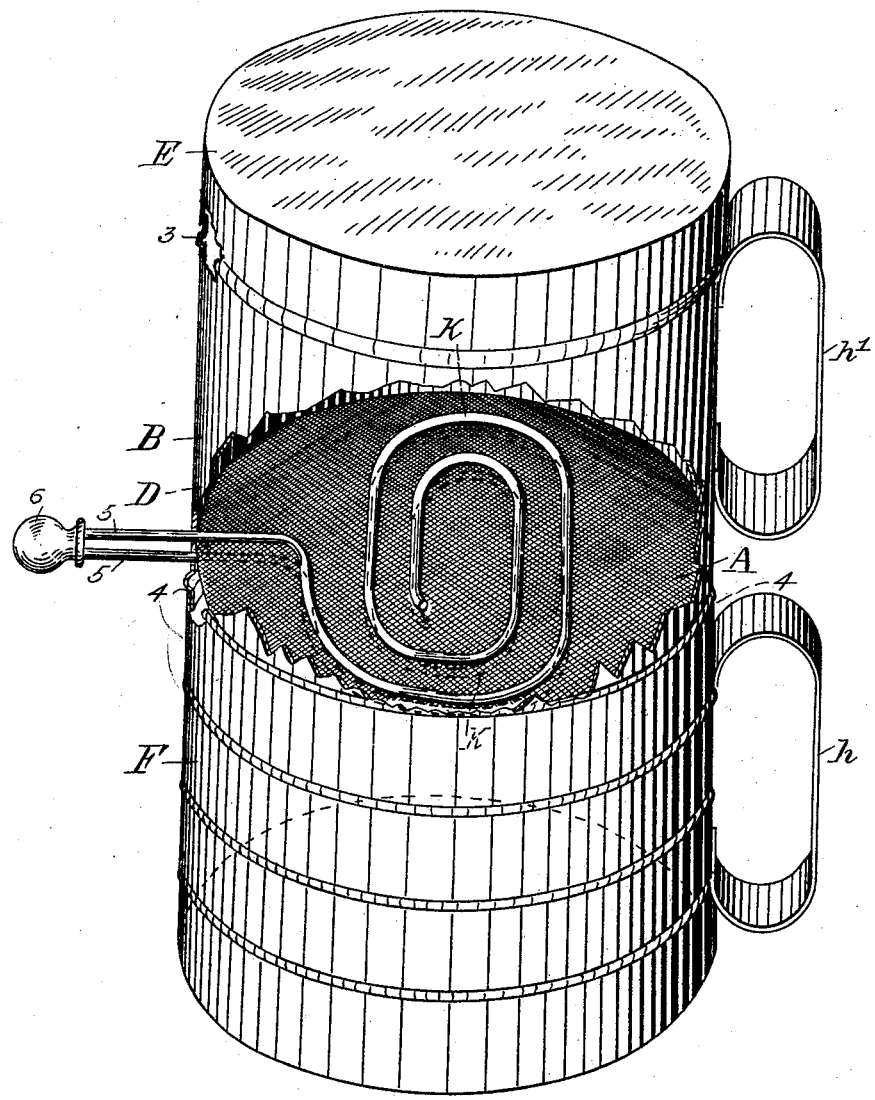
WITNESSES:
INVENTOR.
Eldora B. Siskron
BY Frank E. Adams
ATTORNEY.

UNITED STATES PATENT OFFICE.

ELDORA BALDWIN SISKRON, OF SEATTLE, WASHINGTON.

FLOUR-SIFTER.

SPECIFICATION forming part of Letters Patent No. 683,149, dated September 24, 1901.

Application filed September 6, 1900. Serial No. 29,215. (No model.)

*To all whom it may concern:*

Be it known that I, ELDORA BALDWIN SISKRON, a citizen of the United States of America, and a resident of the city of Seattle, in the county of King and State of Washington, have invented certain new and useful Improvements in Flour-Sifters, of which the following is a specification.

My invention relates to improvements in flour-sifters, and has for its object to facilitate the sifting of flour as used in fine pastry and to improve the construction of flour-sifters whereby they are rendered inexpensive in first cost, durable in use, and economical in operation.

The above and other desirable objects I attain by the constructions, combinations, and arrangement of parts as disclosed on the accompanying drawing, set forth in the following specification, and especially pointed out in the appended claims.

With reference to the drawing included with this specification, the figure is a perspective view of my improved flour-sifter with a portion of the casing thereof broken away to disclose the arrangement of the sieve and the agitators.

Like characters of reference designate corresponding parts throughout the drawing.

It should be understood that in making certain grades of pastry the flour used is required to be repeatedly sifted in order to fully separate the particles thereof and to properly assimilate yeast-powders, if used; otherwise the product will be heavy, coarse, and inferior when baked. The method of sifting this flour as now conducted is to pass it through a sieve the number of times required to properly disintegrate it. This necessitates repeated handling of the flour to repass it to the sieve as now constructed and results in waste of flour and loss of time. By my improved sifter the flour is conveniently and expeditiously handled in repeated siftings without removal from the sifter and is tightly inclosed during the agitation, with a consequent saving of flour and time.

With reference to the drawing, the character A designates a perforate partition conveniently provided in the form of a flat woven-wire sieve of desirable mesh to properly grade the flour.

B is a casing about the sieve and to which it is secured, and in the present embodiment comprises a tubular body conveniently formed from sheet metal, and which is suitably shaped and provided with heads to inclose a chamber extending from each face of the sieve, and is conveniently rendered separable, whereby access is had to either chamber. In the present embodiment the casing B is conveniently divided into three portions, as D, E, and F, which are detachably fitted together by means of suitable lap-joints occurring at points 3 and 4. The portion D is preferably made in the form of a thimble, to which the sieve is attached adjacent one extremity and the opposite end conveniently capped by the portion E and serves to inclose one of the chambers for the flour, while the other chamber is conveniently formed by the portion F, which is of substantially the same depth and diameter as the thimble D and is detachably connected thereto by a lap-joint, as 4. This portion F is conveniently made in the form of a large cup, and it is also conveniently graduated by suitable rings formed in the body, whereby it is adapted for measuring the required amount of flour, and is supplied with a handle $h$ for convenience in use when detached from the thimble portion, which is likewise provided with a handle, as $h'$, for convenience in reversing the sifter.

Within each chamber of the sifter a suitable agitator, as K, is preferably placed, which is positioned to play in close relation to the opposing face thereof to facilitate the sifting of the flour. These agitators are conveniently rendered operative from the exterior of the sifter by means of suitable stems, as 5, projected through the body of the thimble, and both of these stems 5 are preferably connected to a single knob, as 6, whereby both agitators are simultaneously operated and combined as a compound agitator. The agitators are preferably made identical in form, and each consists of a flat elliptic spiral, whose extreme major diameter is somewhat less than the diameter of the body in which it plays and the extreme minor diameter considerably less to permit of liberal movement of the agitator across the opposing face of the sieve, as determined by proper manipulations of the knob 6. A single piece of suitable wire is preferably used to form each agitator, which is first bent to produce the desired number of elliptic convolutions, and the outer end is then bent outwardly at right angles to the major diameter at a point substantially midway the length to form the stem 5, which is attached to the knob 6 after the agitator is placed. Suitable apertures are provided in the body of the casing adjacent the sieve for the projection of the stems of the agitators and are preferably located diametrically opposite the handles for convenience in steadying the sifter by holding said handle with one hand while operating the agitator with the other.

In operating the sifter the casing thereof is separated on the joint 4 and the cup F used to measure the desired quantity of flour, after which the said parts are again connected and the sifter made to stand on the cap E and rest on the table or the like, in which position it is steadied by grasping the handle $h'$ during the manipulations of the agitator to pass the flour from the upper to the lower chamber. When this is accomplished, the sifter is reversed or turned end for end and the operation of sifting repeated as before. The agitator, as shown, performs the work of sifting the flour through the sieve in a rapid manner, owing to its open and flat form, attained by making it of a series of separated convolutions which play across the entire opposing face of the sieve in close contact therewith as the knob is used to reciprocate the agitator and serves to thoroughly disintegrate the flour and reduce it to fine particles.

It will be understood that the flour is inclosed during the entire operation of reducing it to the required degree of fineness, whereby it is kept from spilling, and the work is performed in a rapid, convenient, and neat manner.

Having thus described my invention, what I claim, and desire to secure by Letters Patent, is—

1. A reversible sifter; comprising a thimble having a handle, a detachable cap at one end, and a fixed flat sieve across the opposite end, and a cup detachably engaged by the rim with the sieve end, and a compound agitator consisting of two flat elliptic spirals separated to embrace the sieve each having a stem projecting through the body of the casing and a single knob fastened to both stems.

2. A reversible sifter; comprising a thimble having a handle, a flat sieve fixed across one end, a cap detachably connected at the opposite end by a lap-joint, a cup detachably engaged by the rim in a lap-joint at the sieve end, an aperture in the body of the thimble at each side of the sieve diametrically opposite the handle, a compound agitator consisting of two flat elliptic spirals separated to embrace the sieve and each formed of a single piece of wire with the outer end bent at right angles to the extreme major diameter midway its length and projected through the relative one of said apertures as a stem and a single knob engaged with both stems.

Signed by me at Seattle, Washington, this 27th day of August, 1900.

ELDORA BALDWIN SISKRON.

Witnesses:
W. PARRY SMITH,
C. A. MCKENZIE.